(12) United States Patent
Ouali et al.

(10) Patent No.: US 6,556,747 B2
(45) Date of Patent: Apr. 29, 2003

(54) CHEMICAL MILL METHOD AND STRUCTURE FORMED THEREBY

(75) Inventors: Ali Ouali, Upper Darby, PA (US); Jian-Ming Yuan, Drexel Hill, PA (US); Vipulkumar Patel, South Brunswick, NJ (US)

(73) Assignee: LightMatrix Technologies, Inc., Mount Laurel, NJ (US)

( * ) Notice: Subject to any disclaimer, the term of this patent is extended or adjusted under 35 U.S.C. 154(b) by 37 days.

(21) Appl. No.: 09/917,997

(22) Filed: Jul. 30, 2001

(65) Prior Publication Data

US 2002/0110321 A1 Aug. 15, 2002

Related U.S. Application Data (60) Provisional application No. 60/267,928, filed on Feb. 9, 2001.

(51) Int. Cl.$^7$ .............................. G02B 6/32; G02B 6/36
(52) U.S. Cl. ............................. 385/33; 385/34; 385/79; 385/85
(58) Field of Search ........................... 385/33, 34, 85, 385/79

(56) References Cited

U.S. PATENT DOCUMENTS

| | | | |
|---|---|---|---|
| 4,469,554 A | | 9/1984 | Turner |
| 4,867,521 A | * | 9/1989 | Mallinson ................ 385/34 |
| 5,231,684 A | * | 7/1993 | Narciso et al. ........... 385/80 |
| 5,446,816 A | * | 8/1995 | Shiraishi et al. ......... 385/33 |
| 5,598,493 A | | 1/1997 | Bonham, Jr. et al. |
| 5,606,635 A | | 2/1997 | Haake |
| 5,768,458 A | * | 6/1998 | Ro et al. ................. 385/79 |
| 6,118,917 A | | 9/2000 | Lee et al. |
| 6,303,095 B1 | * | 10/2001 | Nishimura et al. ...... 423/447.2 |

\* cited by examiner

Primary Examiner—John D. Lee
Assistant Examiner—Tina M Lin
(74) Attorney, Agent, or Firm—Michael G. Crilly, Esq.

(57) ABSTRACT

The present invention consists of a method and a structure formed by such method relating to optical fibers. Specifically, the invention consists of a chemical mill process for shaping the end of a fiber and thereby simultaneously forming both lens and precision mounting region. Also described is a self-aligning structure with integral lens. Both features improve light coupling. The lens focuses light energy entering and exiting the fiber. The precision mounting region facilitates alignment of fiber at couplings.

20 Claims, 6 Drawing Sheets

FIG. 1A    FIG. 1B    FIG. 1C    FIG. 1D

PRIOR ART

SECTION A-A

FIG. 10B

SECTION B-B

FIG. 10C

SECTION B-B

CHEMICAL MILL METHOD AND STRUCTURE FORMED THEREBY

CROSS-REFERENCE TO RELATED APPLICATIONS

This application claims benefit under 35 U.S.C. 119(e) from United States Provisional Application No. 60/267,928 filed on Feb. 9, 2001.

FEDERALLY SPONSORED RESEARCH AND DEVELOPMENT

No Government License Rights

BACKGROUND OF THE INVENTION

1. Field of the Invention

The present invention generally relates to a manufacturing method and resultant structure in the field of optical fibers. The invention specifically describes a method to chemically mill a fiber end and the resultant structure consisting of a lens and an attachment structure milled onto the fiber end.

2. Background of the Invention

The performance of optical fibers is critical to the telecommunications industry. Light energy loss is one of the most important parameters for defining fiber performance. Losses occur as light is attenuated while propagating through and exiting from a fiber.

Losses are both intrinsic and extrinsic. Intrinsic losses are caused by the absorption and scattering of light energy within a fiber. Such losses are minimized by core and cladding design. For example, losses as little as 0.4 decibels per kilometer are typical within commercially available single-mode fibers transmitting light at 1550 nanometer wavelength. Extrinsic losses result from back reflections of light at interfaces and misalignment between fiber and other components, such as detectors, light sources, and other fibers. Extrinsic losses are minimized by modifying the fiber end and improving alignment of such fibers with other components. Extrinsic losses are greater than intrinsic, therefore solutions minimizing the former provide significant performance advantages in telecommunication systems.

The related arts provide several methods and devices to minimize extrinsic losses. For example, a lens may be attached to or formed onto a fiber end to focus light. Whereas, precision alignment techniques maximize light energy coupled into neighboring components.

Figures 1, 1A, 1B, 1C, 1D:
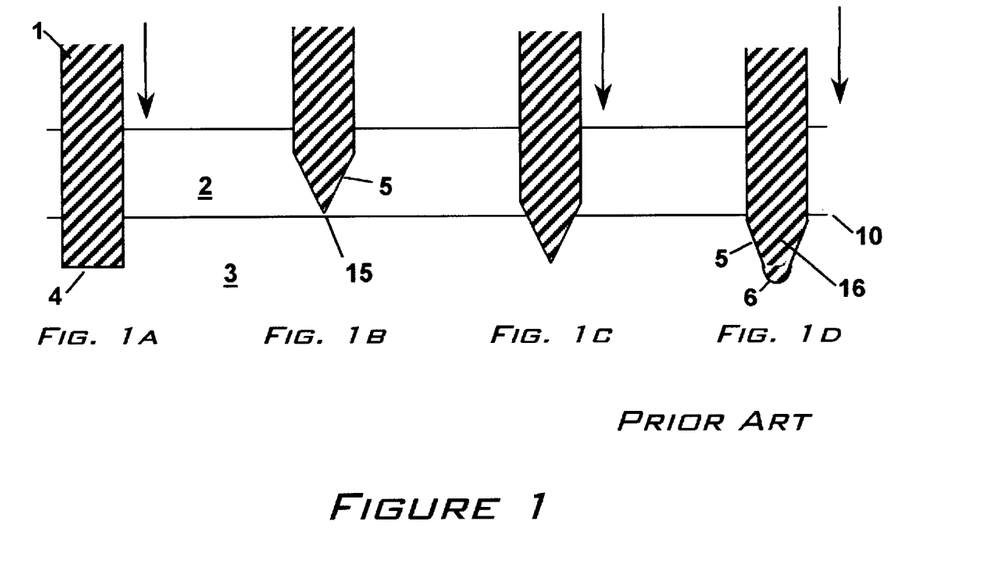
FIGS. 1(a)–1(d). Schematic diagram of related art method.

A chemical etch technique for forming a lens is described in the related arts. Bonham, et al., in U.S. Pat. No. 5,598,493, claims a chemical etch method of forming a lens onto an end of an optical fiber and describes a system to controllably insert and remove a fiber within an acid bath thereby achieving the desired lens shape. FIG. 1 graphically describes the Bonham method. An optical fiber 1 is inserted through an oil bath 2 into an acid bath 3, as shown in FIG. 1A. The optical fiber 1 is positioned so that a predetermined length resides within the acid bath 3 allowing the acid to etch the optical fiber 1. The acid completely etches the optical fiber 1 within the acid bath 3 and partially etches the optical fiber 1 within the oil bath 2, as shown in FIG. 1B. Thereafter, the taper 5 is controllably inserted into the acid bath 3 allowing for further etching of the fiber tip 15 along the acid-oil interface 10, as shown in FIG. 1C. The etch process progresses until a rounded end 6 is formed, as shown in FIG. 1D.

Bonham, et. al. is technically complex in terms of method and equipment. The described method achieves a tapered lens by precisely moving an optical fiber through an acid-oil interface in a multi-step progression. The precise positioning of fiber relative to acid-oil interface requires specialized computer-controlled manufacturing equipment with precision movement capability and software to control movement. Such complexities increase manufacturing costs and limit production yield. Furthermore, Bonham's dependence on the interaction between acid-oil interface and terminal end precludes the controlled etching of fiber beyond the terminal end.

While the coupling end of a component is dimensionally precise, the fiber end attached at such coupling is not. The related arts have sought to address precision alignment between fibers and components by devices and methods separate and distinct from fiber structure.

Currently, optical fibers are precisely aligned by either passive or active means. Lee, et. al., in U.S. Pat. No. 6,118,917, describes a passive device for aligning one or more fibers by positioning an input fiber and an output fiber within a precision grove in two separate blocks and connecting said blocks to a precision coupler block with integral optical waveguide. Lee is an adaptation of the v-groove coupler known within the art. Lee's invention, like other passive devices, provides precision alignment via dimensionally precise components. Proper alignment is merely achieved by attaching a fiber to a device. However, passive alignment devices are not compatible with many optical fiber applications due to size and geometric constraints.

Active alignment is generally a method consisting of positioning and adjusting an optical fiber relative to a mating component until the measured optical power at the other end of the coupling is at least the desired value. Haake, in U.S. Pat. No. 5,606,635, specifically describes an alignment method in which a miniature electrical device aligns one or more optical fibers. Fiber position is adjusted by applying a current to an electrostrictive or piezoelectric material that moves and deflects a fiber. While active alignment methods and devices optimize light energy coupling, they are costly and time consuming.

The related arts clearly demonstrate the limits of existing chemical etch methods as well as alignment methods and devices. What is currently required is a chemical mill method that addresses both focusing and alignment challenges. The method should form a lens onto a fiber end in a simple yet controllable fashion. Furthermore, the method should form a dimensionally precise region adjacent to the fiber end for alignment purposes. The milled fiber should both focus and align light entering or exiting the fiber.

SUMMARY OF THE INVENTION

The current invention provides for the controlled chemical mill of core and cladding of a fiber thereby forming both lens for focusing light and uniform diameter structure facilitating precision alignment of fiber with other components.

The disclosed method provides several advantages over existing methods. First, the method is both simple and reproducible thereby eliminating specialized equipment. Second, the method utilizes a low concentration acid thereby improving surface smoothness along the lens which in turn reduces light scatter and increases coupling efficiency. Third, the method provides a wide range of lens structures that alone or in combination with other lens structures better focuses light entering and exiting an optical fiber. Fourth, the alignment structure provides for a self-aligning fiber. Fifth, the combination lensed fiber with alignment structure provides for greater coupling of light energy into other components.

It is therefore an object of the present invention to avoid the disadvantages of the related art. More particularly, it is the object of the invention to provide a chemical mill method to simultaneously form both lens and alignment structure onto an optical fiber. It is also an object of the invention to provide a method to form such lens and alignment structure by statically positioning an optical fiber within an acid bath. It is also an object of the invention to provide a chemical milling method capable of forming a wide variety of lens shapes, examples including curved, frustum, and conical shaped lenses. It is also an object of the invention to provide a fiber end with conical lens and alignment structure. It is also an object of the invention to provide a fiber end with frustum shaped lens and alignment structure. It is also an object of the invention to provide a fiber end with frustum shaped lens onto which a second lens is attached. It is also an object of the invention to provide a method to form a wedge shaped lens.

REFERENCE NUMERALS

1 Optical fiber
2 Oil bath
3 Acid bath
4 Terminal end
5 Taper
6 Rounded end
7 Transition structure
8 Central axis
9 Frustum lens
10 Acid-oil interface
11 Lens angle
12 Microlens
13 Attachment structure
15 Fiber tip
16 Lens
17 Core
18 Cladding
19 Curved lens
20 Composite lens
21 Fiber end
22 Reference depth
23 Acid-cladding interface
24 Cladding diameter
25 Base diameter
26 Wedge Lens
27 Minor axis
28 Major Axis
30 Etchant bath
31 Surface
32 Core diameter
33 Fiber end

DESCRIPTION OF THE INVENTION

Figures 2, 2A, 2B:
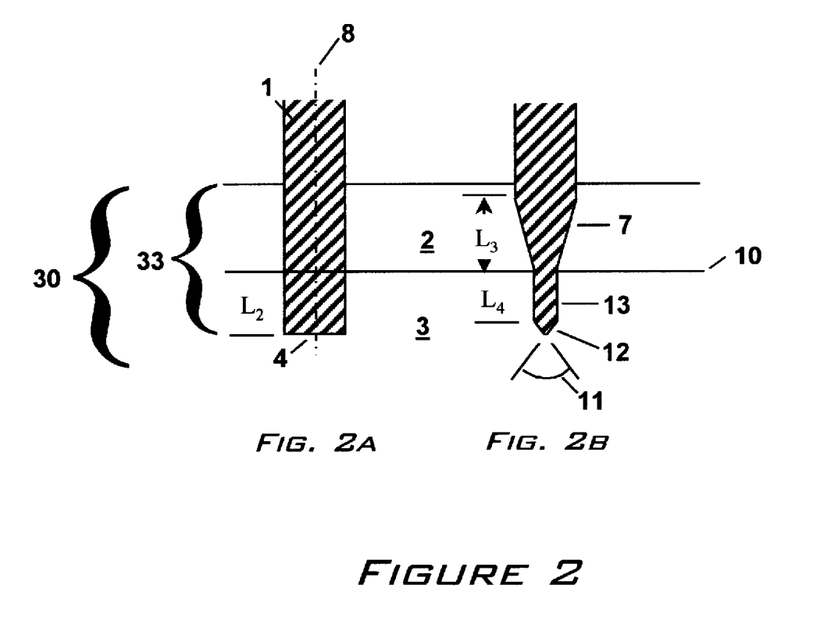
FIGS. 2(a)–2(b). Schematic diagram describing alignment and lens structures for the present invention FIGS. 3(a)–3(d). Schematic diagram describing the present invention method.
Figure 3A:
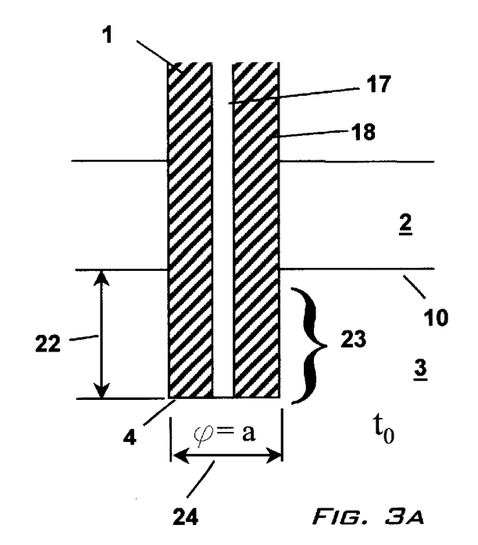
Figure 3B:
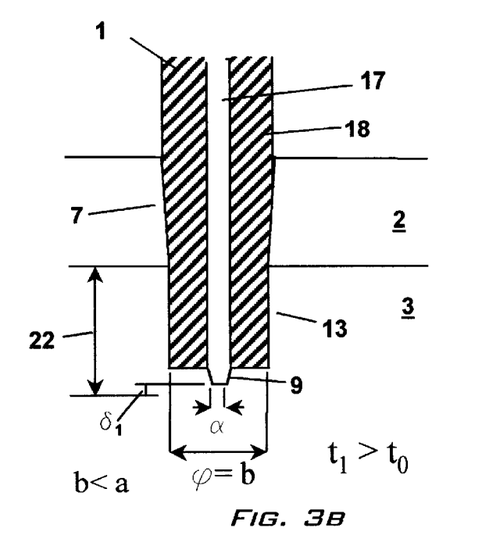
Figure 3C:
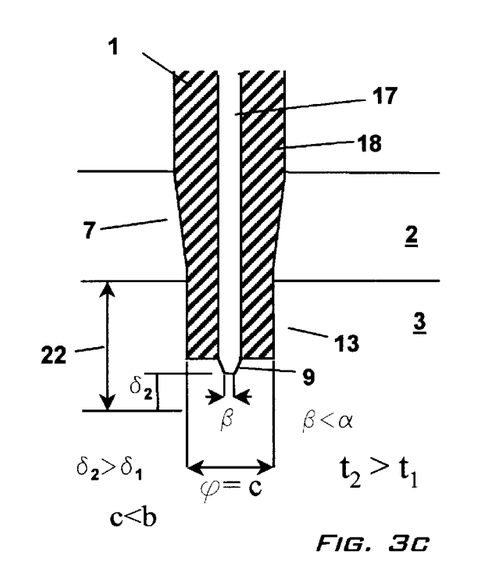
Figure 3D:
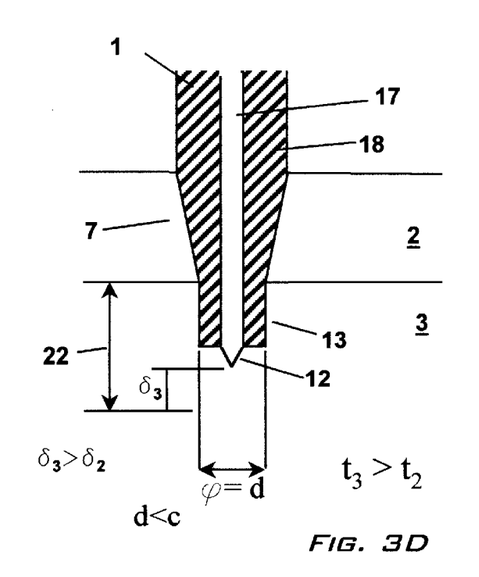
Figure 4:
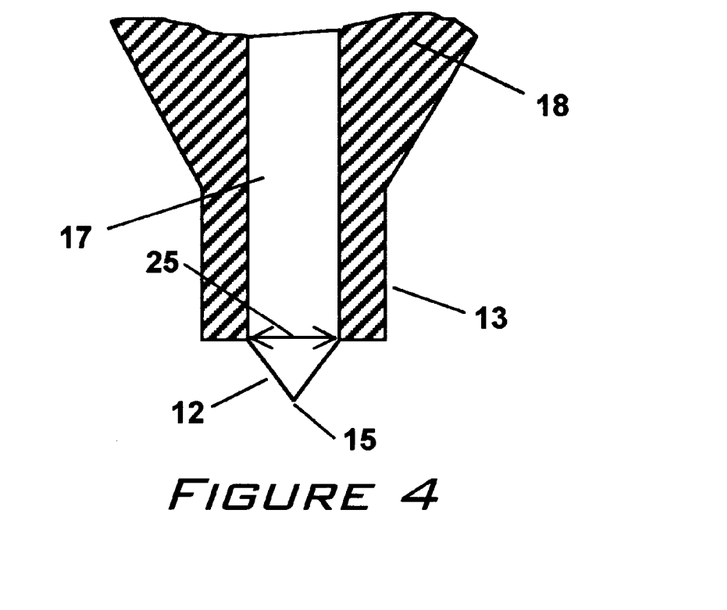
FIG. 4. Enlarged view of fiber tip showing mircolens of equal diameter to the core.
Figure 5:
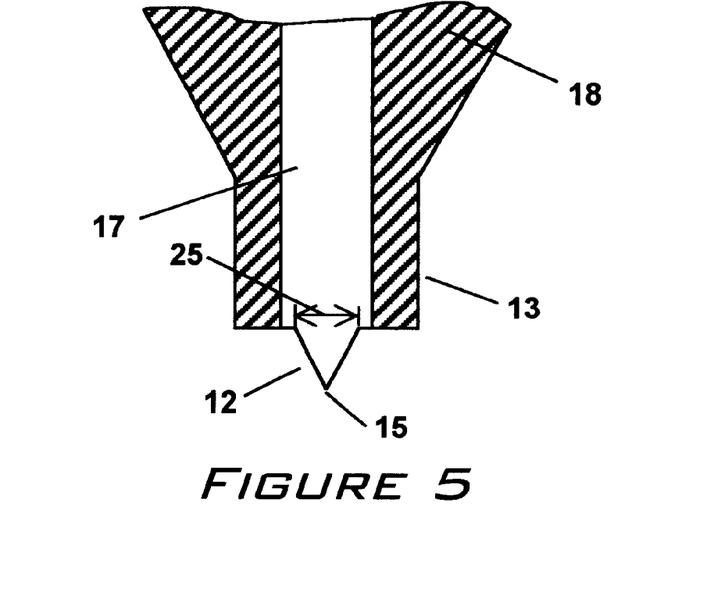
FIG. 5. Enlarged view of fiber tip showing mircolens of smaller diameter than core.
Figure 6:
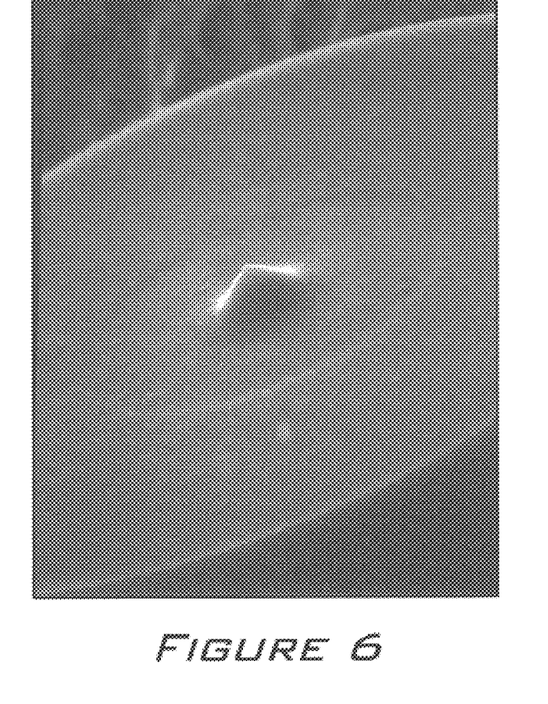
FIG. 6. Photograph of chemically milled optical fiber showing terminal end with microlens.
Figure 7:
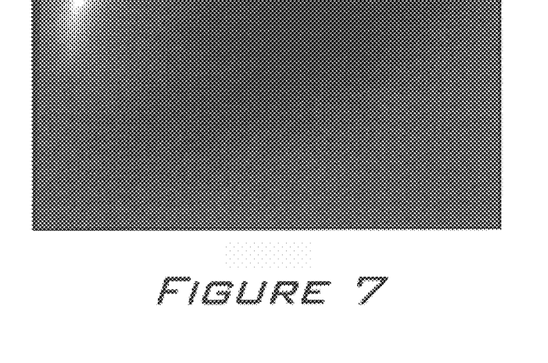
FIG. 7. Photograph of chemically milled optical fiber showing frustum shaped microlens.
Figure 8:
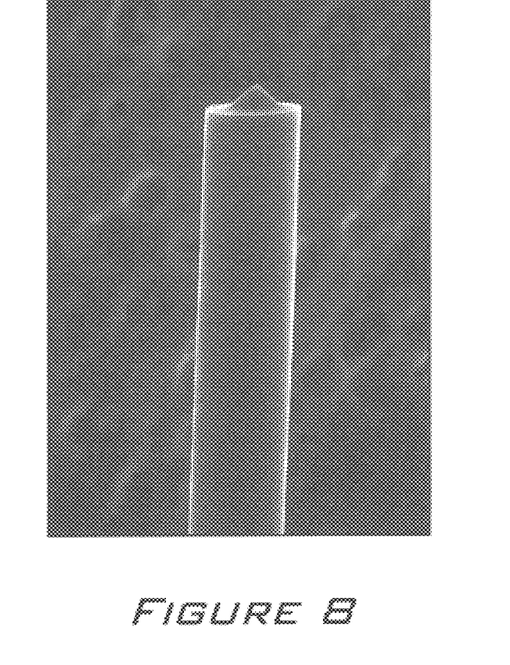
FIG. 8. Photograph of chemically milled optical fiber showing cylindrical attachment structure and microlens.
Figure 9:
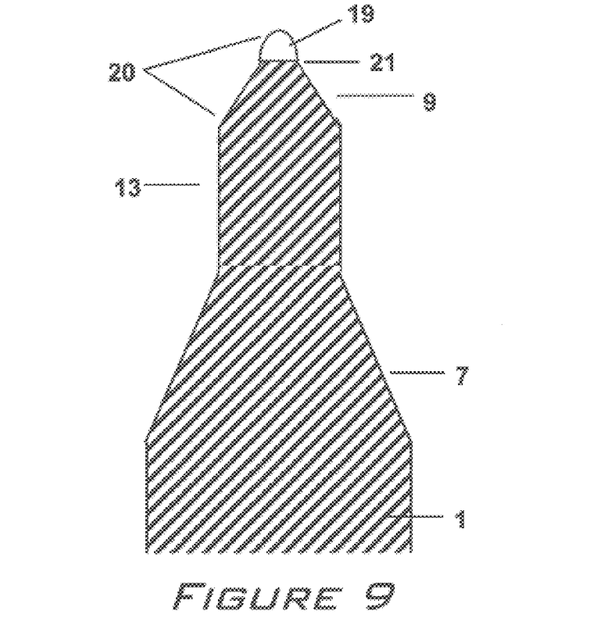
FIG. 9. Cross-section view of fiber with composite lens consisting of a chemically milled frustum and circular cap.
Figure 10A:
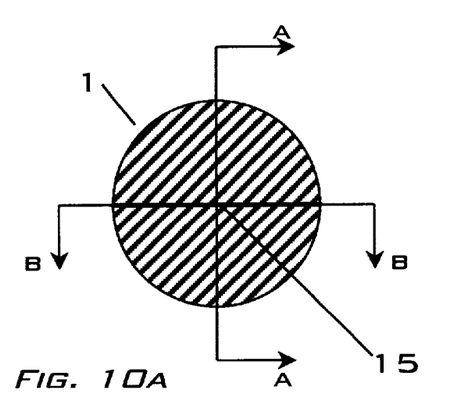
FIGS. 10(a)–10(d). Views describing wedge shaped lens.

FIG. 2 generally describes the present invention. FIG. 3 describes the present invention method for forming a microlens 12 and an attachment structure 13. FIGS. 4 and 5 show an enlarged view of two microlens 12 embodiments. FIGS. 6 and 8 are scanning electron microscope (SEM) images of conical microlenses 12 formed by the described method. FIG. 7 is an SEM image of a frustum lens 9 formed by the present method. FIG. 9 shows a composite lens 20 consisting of frustum lens 9 and curved lens 19. FIG. 10 shows a wedge lens 26. Component dimensions are not to scale. While circular fibers are presented and described, the scope of the invention is not limited to such form and is intended to include square, rectangular, polygonal, elliptical, and near circular shapes. While drawings may describe single layer microlenses 12, composite structures consisting of two or more layers and a plurality of materials are within the scope of claims. The described invention applies to both single-mode and multiple-mode fibers.

FIG. 2 shows an optical fiber 1 within an etchant bath 30. A polymer jacket surrounding the optical fiber 1 is removed, the optical fiber 1 is cleaned and thereafter cleaved forming a planar terminal end 4 perpendicular to the central axis 8 of the optical fiber 1. A variation of this method provides cleaving prior to the removal of the polymer jacket. The perpendicularity between terminal end 4 and central axis 8 insures symmetry in the resultant microlens 12. An asymmetric lens is produced by cleaving the terminal end 4 at an angle with respect to the central axis 8 of the optical fiber 1.

The optical fiber 1 is inserted through an oil bath 2 so that a predetermined length $L_2$ is statically fixed within an acid bath 3, as shown in FIG. 2A. The optical fiber 1 initially residing within the oil bath 2 and acid bath 3 constitutes the fiber end 33. The central axis 8 should be perpendicular to the surface 31 of the etchant bath 30 to produce a symmetric microlens 12. The length of optical fiber 1 within the acid bath 3 is dictated by the end application of the item. The optical fiber 1 is chemically milled until an attachment structure 13 of length $L_4$, transition structure 7 of length $L_3$, and microlens 12 are formed, as shown in FIG. 2B. Thereafter, the optical fiber 1 is extracted from the acid bath 3 and cleaned to remove acid and oil residues. In an alternate embodiment, chemical milling of the transition structure 7 is minimal thereby resulting is a nearly cylindrical geometry.

FIG. 3 describes the progressive milling of an optical fiber 1 wherein a microlens 12, from frustum to cone, is formed onto a core 17. Core 17 and cladding 18 are inserted through the oil bath 2 and into the acid bath 3. The optical fiber 1 is held in a stationary position within the acid bath 3 during milling. The initial distance between terminal end 4 and acid-oil interface 10 is the reference distance 22. Chemical milling progresses at the terminal end 4 exposing and shaping the core 17 and along the acid-cladding interface 23 symmetrically reducing the cladding diameter 24, as shown in FIG. 3B. Further milling of the optical fiber 1 produces a pronounced chamfer along the exposed core 17 thereby forming a frustum lens 9 and an attachment structure 13, as shown in FIG. 3C. The optical fiber 1 is removed from the etchant bath 30 if a frustum lens 9 is desired. If milling is allowed to progress beyond FIG. 3C, a conical microlens 12 is formed and the cladding diameter 24 is further reduced within the attachment structure 13, as shown in FIG. 3D. While FIG. 3 shows conical structures, other curved structures are possible. For example, the terminal end 4 may be masked with materials known within the art to further control milling.

Two embodiments of the microlens 12 are shown in FIGS. 4 and 5. In FIG. 4, the base diameter 25 of the microlens 12 is equal to the core diameter 32. In FIG. 5, the base diameter 25 of the microlens 12 is less than the core diameter 32. Both embodiments show the microlens 12 as an integral part of the core 17 located at one end of the attachment structure 13. The shape of the microlens 12 is controlled by fiber type, properties of the etchant bath 30, and mill time. Typically, materials composing core 17 and cladding 18 differ, therefore mill rates differ in these materials. While a linear structure is shown between fiber tip 15 and base diameter 25 in FIGS. 4 and 5, convex and concave profiles are also possible. FIG. 6 shows a typical conical shaped microlens 12 formed after a three hour chemical mill. FIG. 7 shows a typical frustum lens 9 formed after a one hour chemical mill. Total mill time required to form the desired shape is influenced by the temperature and concentration of the acid bath 3.

The microlens 12 is located at one end of the attachment structure 13, the latter facilitating mounting and attachment of the optical fiber 1 to other components. FIG. 8 shows a typical microlens 12 and attachment structure 13. The length and diameter of the attachment structure 13 is application dependent. The diameter of the attachment structure 13 is controlled by acid strength and mill time. Precision mounting and alignment of the optical fiber 1 is determined by dimensional variations in diameter and concentricity of the cladding 18 after milling. The length and depth of the transition structure 7 is controlled by acid bath 3 strength, thickness and type of oil bath 2, and mill time.

Mill rate is controlled by acid type, concentration, and temperature, as well as fiber composition. Mill time also influences lens angle 11, although to a lesser degree. The preferred acid bath 3 consists of a buffered solution at room temperature. For example, an acid bath 3 consisting of 5 parts hydrofluoric acid (HF) at 49% concentration and 1 part ammonium fluoride ($NH_4F$) at 40% concentration will form a frustum lens 9 on a single-mode optical fiber 1 typically within one hour and a microlens 12 typically within three hours having a lens angle 11 of approximately 100 degrees. Organic oil is added above the acid bath 3 to minimize acid vapor production during milling and to alter the milling rate adjacent to the acid-oil interface 10. The most preferred oil is vegetable oil.

Coupling efficiency is related to the surface finish on a microlens 12. Generally, coupling efficiency decreases with increased surface roughness. Surface roughness is controlled by acid concentration and mill time. Higher acid concentration decreases total mill time yet increases surface roughness. Lower acid concentration increases total mill time yet produces a smoother surface finish. Lens smoothness is maximized and mill time minimized by adjusting the quantity and type of buffering agent within the acid bath 3.

A variation of the method described above provides a composite lens 20 consisting of a frustum lens 9 whereon is attached or deposited a curved lens 19. FIG. 9 shows a typical composite lens 20 on the end of an optical fiber 1. The optical fiber 1 is removed from the acid bath 3 prior to the complete formation of a microlens 12, as shown in FIG. 3C. The resulting lens structure is referred to as a frustum lens 9 of which FIG. 7 shows a typical example. Thereafter, the optical fiber I is cleaned to remove acid and oil residues. Next, a curved lens 19 is attached to the fiber end 21 of the frustum lens 9, as shown in FIG. 9. For example, the curved lens 19 may be attached by either adhesive or thermally fusing lens material to the core 17.

Figures 10B, 10C, 10D:
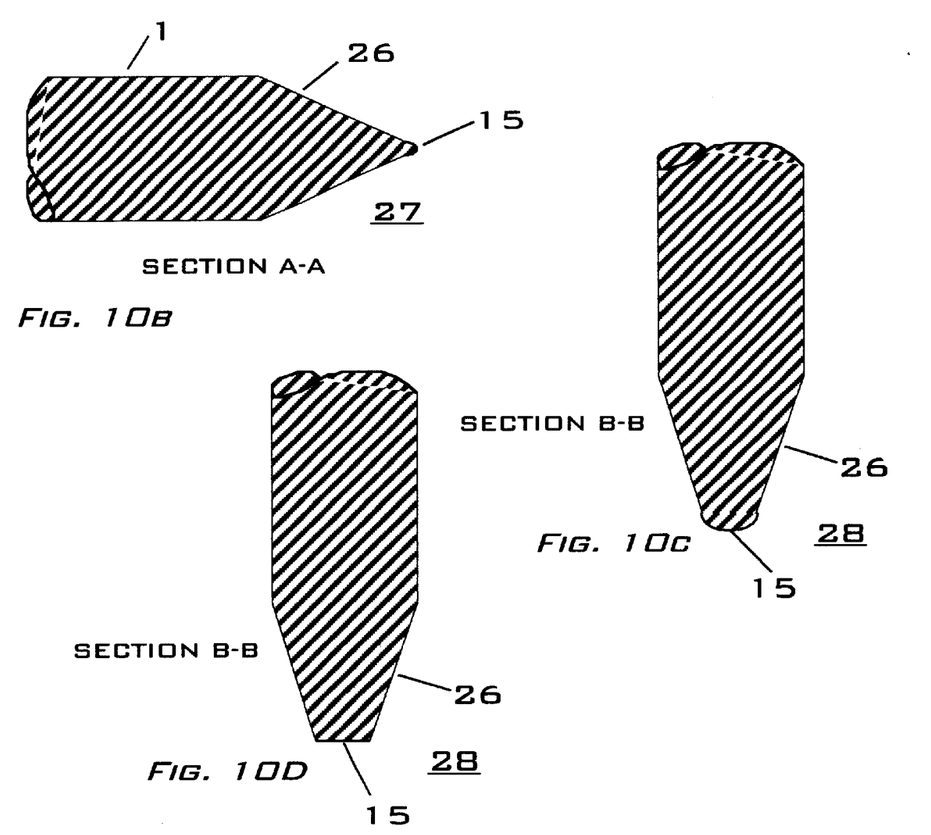

FIG. 10 shows a typical wedge lens 26. The method to form such lens includes the steps of mechanically machining the terminal end 4 of an optical fiber 1 to form a wedge lens 26. Thereafter, chemical milling shapes the minor axis 27, see FIG. 10B, and major axis 28, see FIGS. 10C and 10D, of fiber tip 15. Two embodiments of the major axis 28 are possible. FIG. 10C describes a curved fiber tip 15. FIG. 10D describes a linear fiber tip 15.

Such circular lenses 19 are formed by various methods known within the art. Curved lens 19 materials include glass and glass-like compositions. To further improve lens performance, single or multiple layered anti-reflection coatings may be applied onto any of the lens structures described herein. Specific anti-reflection coating materials include $SiO_2$, $Ta_2O_5$, $Nb_2O_5$, $TiO_2$, $Si_3N_4$, diamond, diamond like carbon, transparent polymers, and compounds thereof.

The description above indicates that a great degree of flexibility is offered by the described methods to form various microlenses 9, composite lenses 20, and attachment structures 13. Although the present invention has been described in considerable detail with reference to certain preferred versions thereof, other versions are possible. Therefore, the spirit and scope of the appended claims should not be limited to the description of the preferred versions contained herein.

What is claimed is:

1. A method for simultaneously milling a lens onto a fiber end and an attachment structure immediately adjacent to said lens, said lens focusing light entering and exiting an optical fiber, said attachment structure aligning said optical fiber at a coupling, comprising the steps of:
   a. cleaving said optical fiber;
   b. fixing a length of said fiber end within an etchant bath, said fiber end statically positioned within said etchant bath; and
   c. milling said length of said fiber end thereby forming both said lens and said attachment structure.

2. The method of claim 1, further comprising the step of forming a wedge onto said fiber end prior to said fixing step.

3. The method of claim 1, further comprising the step of stripping a polymer jacket from said fiber end prior to said fixing step.

4. The method of claim 1, wherein said cleaving step insures a terminal end perpendicular to a central axis of said optical fiber.

5. The method of claim 1, wherein said etchant bath consists of an oil bath covering a buffered acid bath.

6. The method of claim 5, wherein said oil bath is an organic oil.

7. The method of claim 5, wherein said oil bath is vegetable oil.

8. The method of claim 5, wherein said buffered acid bath is 5 parts HF at 49% concentration and 1 part $NH_4F$ at 40% concentration.

9. The method of claim 1, wherein said milling step forms a transition structure along said optical fiber within said oil bath, said transition structure having a first end of equal diameter to said attachment structure and a second end of equal diameter to said optical fiber.

10. The method as in one of claims 1–9, wherein said fiber is a single-mode optical fiber.

11. The method of claim 1, wherein said lens is conical.

12. The method of claim 1, wherein said lens is a frustrum, said frustrum having a first end forming a fiber tip.

13. The method of claim 12, furthering comprising the step of applying a lens material onto said fiber tip.

14. The method of claim 13, furthering comprising the step of shaping said lens material.

15. A self-aligning fiber end with an integral light focusing structure comprising:

a. a lens structure; and b. an alignment structure, said alignment and said lens structures simultaneously milled onto said fiber end, said alignment structure having a dimensionally precise outer surface of sufficient dimensions to align said fiber end with a second element thereby maximizing light coupling.

16. The self-aligning fiber end of claim 15, wherein said lens structure is conical.

17. The self-aligning fiber end of claim 15, wherein said lens structure is a wedge.

18. The self-aligning fiber end of claim 15, wherein said lens structure is a frustum with a first end forming a fiber tip.

19. The self-aligning fiber end of claim 18, further comprising a second lens attached to said first end of said frustum.

20. The self-aligning fiber end of claim 15, further comprising a transition structure, said transition structure having a first end of equal diameter to said attachment structure and a second end of equal diameter to said optical fiber.

\* \* \* \* \*